Oct. 13, 1925.
J. G. CAMPBELL
1,557,194
ELECTRICAL APPARATUS
Filed March 27, 1924
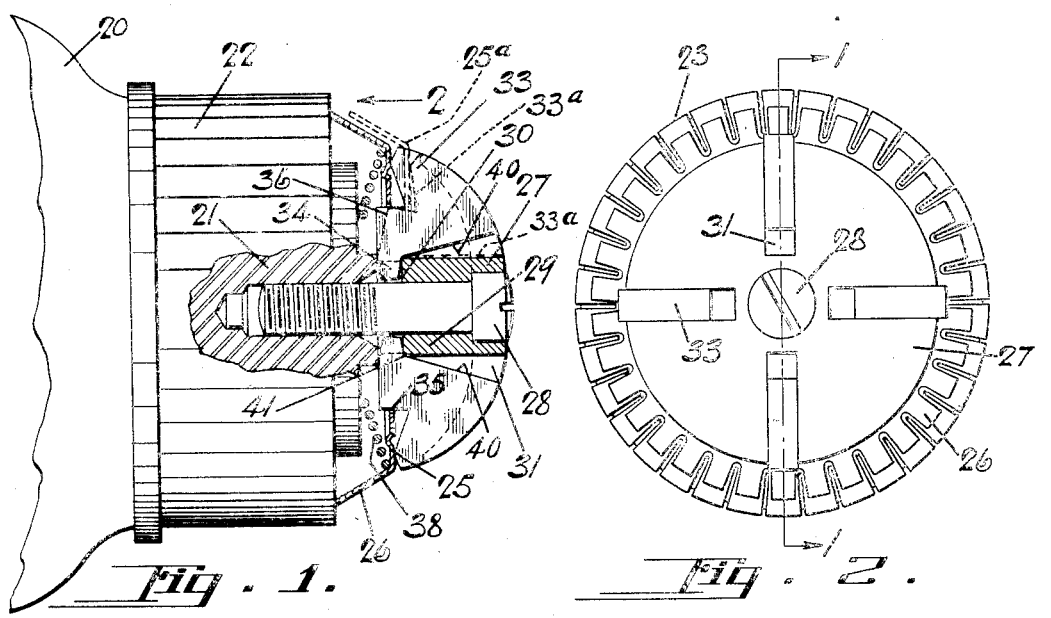
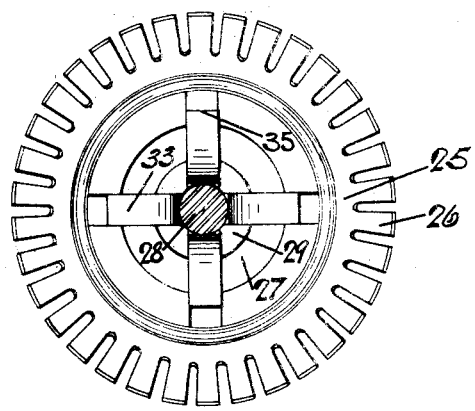
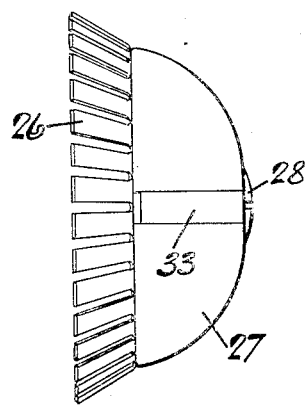
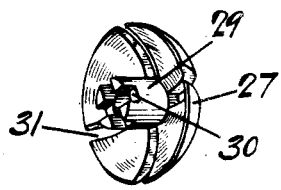
Inventor
John G. Campbell
By Spencer Sewall and Hardman
his Attorneys Patented Oct. 13, 1925.

1,557,194

UNITED STATES PATENT OFFICE.

JOHN G. CAMPBELL, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed March 27, 1924. Serial No. 702,457.

*To all whom it may concern:*

Be it known that I, JOHN G. CAMPBELL, a citizen of the United States of America, residing at Dayton, county of Montgomery, State of Ohio, have invented certain new and useful Improvements in Electrical Apparatus, of which the following is a full, clear, and exact description.

The present invention relates to a short circuiting device for the commutator of a repulsion induction motor.

One of the objects of the present invention is to simplify the construction of a commutator short circuiting device and to improve the electrical contact between the commutator and the short circuiting device.

Further objects and advantages of the present invention will be apparent from the following description, reference being had to the accompanying drawing, wherein a preferred embodiment of one form of the present invention is clearly shown.

In the drawings:

Fig. 1 is a fragmentary view, partly in section, of the armature of a motor and the improved short-circuiting device, the section being taken on line 1—1 of Fig. 2;

Fig. 2 is an end view of the short-circuiting device looking in the direction of arrow 2 in Fig. 1;

Fig. 3 is a view looking in the opposite direction from that of arrow 2;

Fig. 4 is a side elevational view of the short circuiting device; and

Fig. 5 is a perspective view on a reduced scale of one of the elements of the device.

Referring to the drawings, 20 is an armature of a motor provided with a shaft 21 carrying a commutator 22 having segments 23, the armature being supported for rotation by bearings (not shown) located adjacent the end of the armature remote from the commutator.

The short circuiting device for the segments 23 of the commutator 22 comprises a disc 25 having flared portions providing a plurality of fingers 26. Fingers 26 are adapted to be moved in and out of engagement with the commutator segments 23 for short circuiting the same. A weight retaining member 27 having a shank 29 is secured by a screw 28 to the shaft 21. The end of shank 29 abuts the end of the shaft 21 and is provided with a plurality of sockets 30. The head of member 27 is provided with a plurality of slots 31 formed in alignment with the sockets 30. Weights 33 are received by the slots 31 and are provided with lug portions 34 which fit within socket 30 and thereby form a lug and socket joint between the weights 33 and the member 27. The disc 25 is located between the weights 33 and the commutator 22. Disc 25 is provided with a plurality of notches 35, each adapted to receive the portion 36 of a weight 33 which extends toward the commutator. A spring 38 is disposed between the commutator 22 and the disc 25 and normally tends to maintain the fingers 26 out of engagement with the commutator segments 23.

Fig. 1 shows the position of the weight 33, the disc 25 and fingers 26 when the motor is operating as an induction motor, that is, when all the commutator segments are short circuited by the disc 25. However, when the motor is idle the disc 25 and the weights 33 are in the positions shown in dotted line at $25^a$ and $33^a$, in which position the spring 38 forces fingers 26 away from the commutator segments 23 and the surface 40 of the weight 33 is forced against the bottom of the slot 31. As the speed of the motor increases, the weights 33 will fly outwardly each pivoting about an edge 41 of the member 27. The outer end of each weight 33 will engage the disc 25 to cause the fingers 26 to move inwardly. The weights 33 will tend to move radially, however, to engage the commutator segments 23 to short circuit the same but the projecting portions 36 of the weights 33 will engage the disc 25 at the end edges of the notches 35. Thus the disc 25 prevents the radial displacement of the weights 33. The weights 33 are prevented from being moved horizontally out of position by the lug and socket connection between said weights and member 27.

To remove the short circuiting device from the armature 20, it is only necessary to remove the screw 28. The parts of the device are readily disassembled since they are not connected together by pins or the like. Removal of the disc 25, allows the weights 33 to be withdrawn from the weight retainer 27.

While the form of embodiment of the present invention as herein disclosed, constitutes a preferred form, it is to be understood that other forms might be adopted, all coming within the scope of the claims which follow.

What I claim is as follows:

1. An electric motor comprising, in combination, a shaft; a commutator mounted on the shaft; and a short circuiting device for the commutator including: an axially movable short circuiting contact for engaging the commutator segments, a spring for urging said contact out of short circuiting position, a plurality of centrifugal arms for urging said contact into short circuiting position at a predetermined speed of rotation, a retaining member for said arms mounted upon said shaft, said arms each having a lug loosely set in a socket in said retaining member forming a pivot for said centrifugal arms, said arms being held against radial displacement from said sockets by said short circuiting contact.

2. An electric motor comprising, in combination, a shaft; a commutator mounted on the shaft; and a short circuiting device for the commutator including: an axially movable short circuiting contact for engaging the commutator segments, a spring for urging said contact out of short circuiting position, a plurality of centrifugal arms for urging said contact into short circuiting position at a predetermined speed of rotation, a dome shaped retaining member for said arms mounted upon said shaft and having sockets therein, each of said arms having a lug loosely set in one of said sockets thereby forming a pivot for said centrifugal arms, said dome shaped member forming a protection for said centrifugal arms against derangement by reason of coming in contact with outside influences.

In testimony whereof I hereto affix my signature.

JOHN G. CAMPBELL.